Dec. 14, 1954
A. P. STROM
2,697,154
CIRCUIT INTERRUPTER
Filed May 26, 1951
4 Sheets-Sheet 2
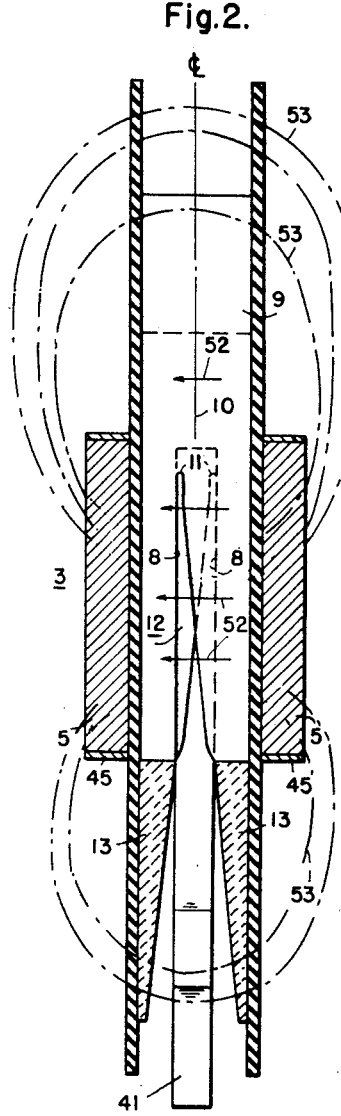
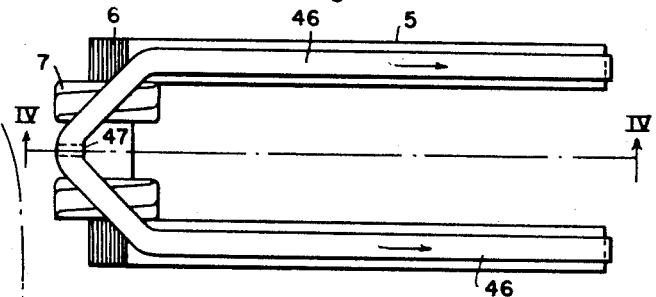
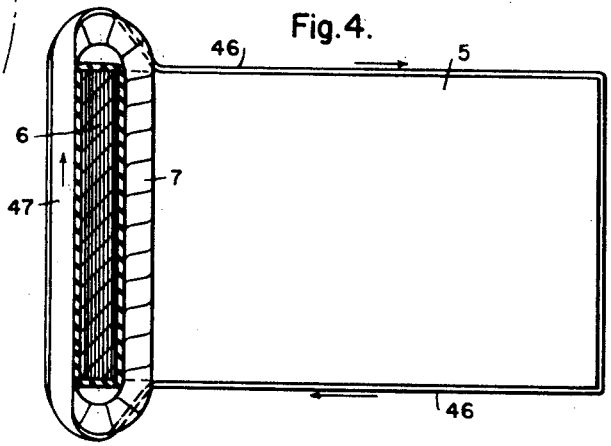
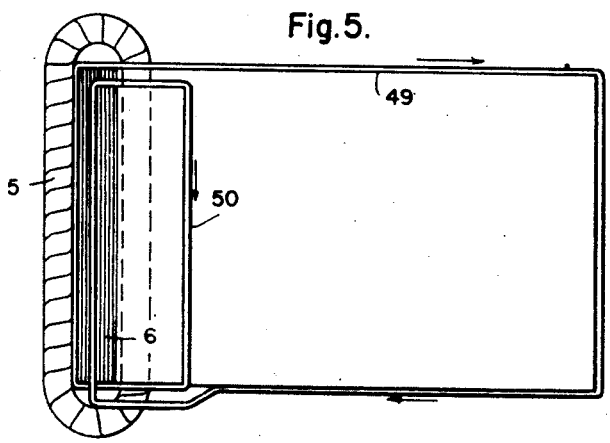
WITNESSES:
E. A. McCloskey.
W. R. Crout
INVENTOR
Albert P. Strom.
BY
Ralph H. Swingle
ATTORNEY Dec. 14, 1954  A. P. STROM  2,697,154
CIRCUIT INTERRUPTER
Filed May 26, 1951  4 Sheets-Sheet 3

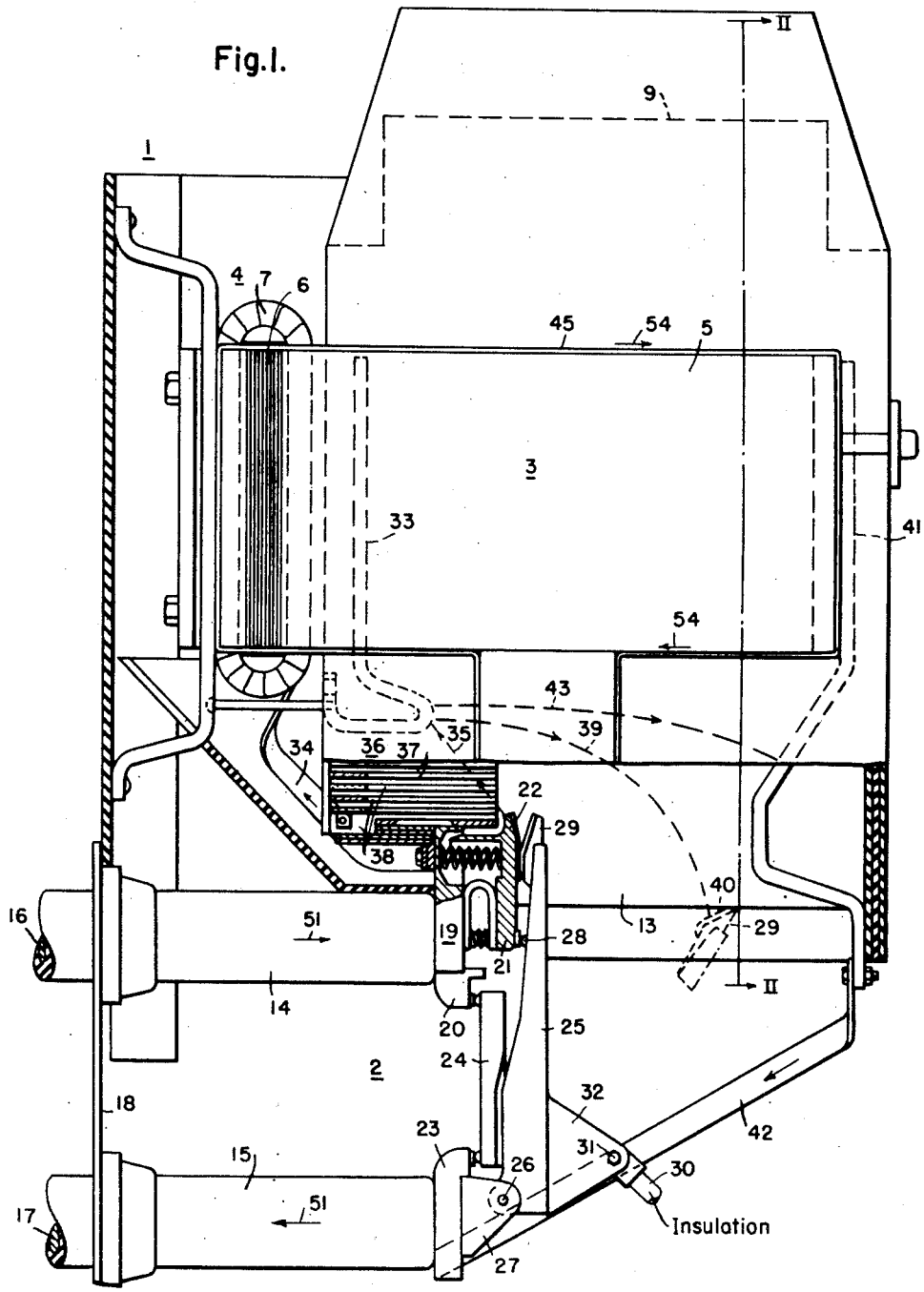

WITNESSES:
E.A.McCloskey
W.R.Crout

INVENTOR
Albert P. Strom.
BY
Ralph H. Swingle
ATTORNEY

Dec. 14, 1954  A. P. STROM  2,697,154
CIRCUIT INTERRUPTER
Filed May 26, 1951  4 Sheets-Sheet 4
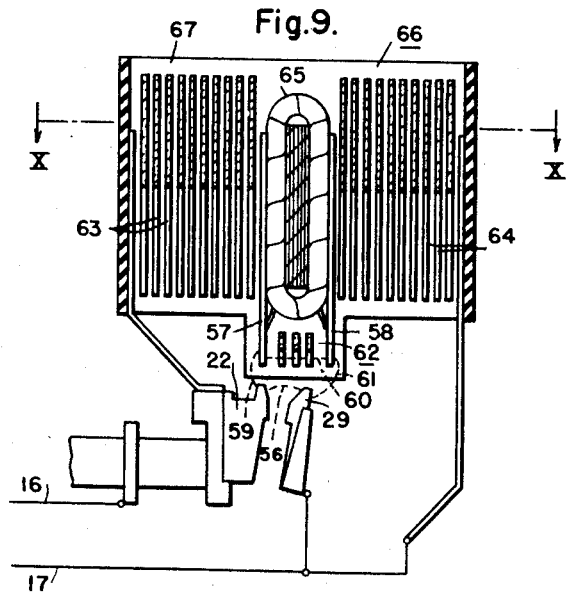
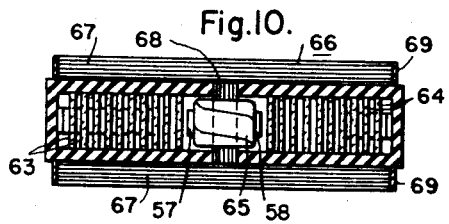
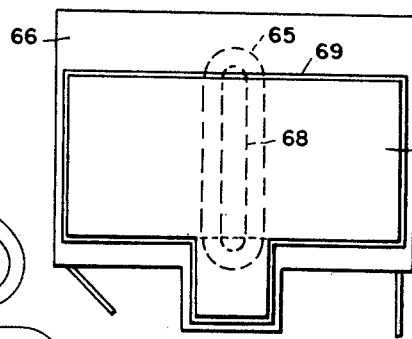
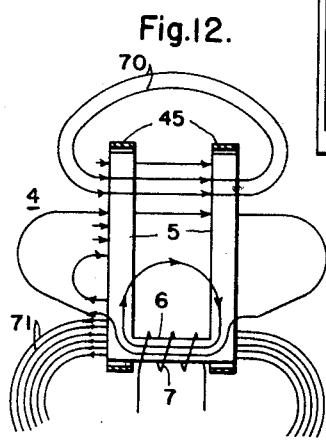
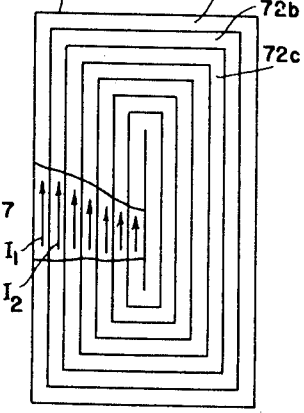
INVENTOR
Albert P. Strom.
BY
Ralph H. Swingle
ATTORNEY

2,697,154

CIRCUIT INTERRUPTER

Albert P. Strom, Pittsburgh, Pa., assignor to Westinghouse Electric Corporation, East Pittsburgh, Pa., a corporation of Pennsylvania Application May 26, 1951, Serial No. 228,418

14 Claims. (Cl. 200—147)

This invention relates to circuit interrupters in general, and, more particularly, to arc-extinguishing structures therefor.

A general object of my invention is to provide a more effective, compact and more economically manufactured circuit interrupting device, which will more effectively interrupt the circuit therethrough than has heretofore been obtained.

A more specific object of my invention is to provide an improved magnetic structure for a circuit interrupter, particularly one of the air-break type, in which the leakage flux is considerably minimized to thereby result in the establishment of a greater amount of useful magnetic flux across the arc chute.

In the design of magnetic air breakers, one of the critical factors is the field strength available for a given current, particularly for the maximum current to be interrupted. In circuit interrupters utilizing a spaced slotted ceramic plate type of interrupter, as set forth in U. S. Patent 2,442,199, issued May 25, 1948, to Robert C. Dickinson and Russell E. Frink and assigned to the assignee of the instant application, it has been observed that increasing the strength of the magnetic field permits a proportionate increase in "offset" of the arc guiding slots in the ceramic arc chute plates, and hence a proportionate increase in the maximum length of the arc path with corresponding decrease in the restored voltage gradient applied to the arc path. Oscillographic studies indicate that the ability of the heated arc trail on the surfaces of the ceramic plates to withstand this restored voltage gradient without breakdown determines the voltage interrupting ability of the breaker. Hence, any increase in the available field strength should permit a directly proportionate increase in the interrupting rating of the breaker.

I have made a study of the distribution in both space and time (phase) of the flux density and of the total flux within the arc chute space at currents up to 15,600 amperes with 18 coil turns in series on the magnet yoke. Measurements of total leakage flux were also made. I have devised a simple and highly effective method for suppressing the leakage flux and so boosting the useful flux. The results obtained in applying my invention suggest a possible increase in breaker interrupting rating of about 50% as a result of this easily accomplished improvement in magnet efficiency.

Further objects and advantages will readily become apparent upon reading the following specification taken in conjunction with the drawings in which:

Fig. 1 is a side elevational view, partially in section, of an air-break type of circuit interrupter embodying my invention and shown in the closed circuit position;

Fig. 2 is a vertical sectional view taken along the line II—II of Fig. 1, looking in the direction of the arrows;

Fig. 3 is a top plan view of a modified type of magnet structure which may be utilized in connection with the arc chute structure set forth in Figs. 1 and 2;

Fig. 4 is a vertical sectional view taken along the line IV—IV of Fig. 3, looking in the direction of the arrows;

Fig. 5 is a side elevational view of a modified type of magnet structure which may be used in place of that utilized in Figs. 1 and 2;

Fig. 9 is a somewhat diagrammatic vertical sectional view taken through a modified type of circuit breaker, utilizing an H-type of magnet and employing my invention;

Fig. 10 is a plan view in section taken along the line X—X of Fig. 9;

Fig. 11 is a side elevational view of the arc chute alone, with the contacts omitted, of the circuit breaker of Fig. 9 and 10;

Fig. 12 is a diagrammatic view illustrating some of the principles of my invention; and Fig. 13 indicates the current flow in a flux suppressor plate, which may be used in place of a single short-circuited band.

Figure 6:
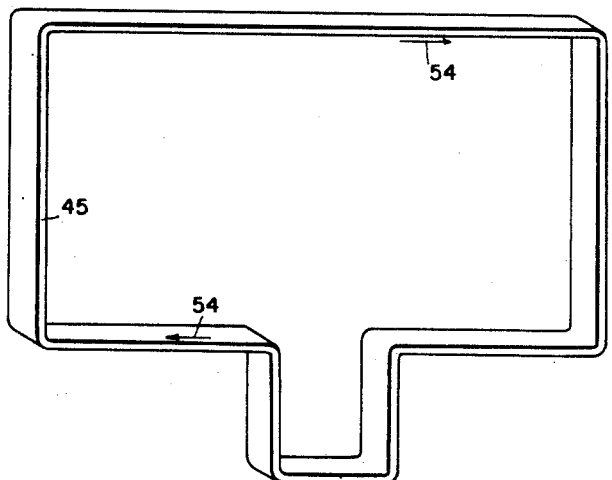
Fig. 6 is a perspective view of the type of magnetic leakage suppressor which is employed in Figs. 1 and 2.

Referring to the drawings, and more particularly to Fig. 1 thereof, the reference numeral 1 generally designates a circuit interrupter, particularly one of the air-break type employing contact structure 2 operable to establish an arc, with an arc chute structure 3 functioning to interrupt the established arc.

Associated with the arc chute structure 3 is a magnet 4 including a pair of pole plates 5 (Fig. 2) magnetically interconnected by a yoke 6. The magnet 4 is energized by sending current through an energizing winding 7, which is normally shorted out of the circuit in the closed circuit position of the device.

During the opening operation, as more fully described hereinafter, the exciting winding or coil 7 is energized by the series circuit to set up a transverse magnetic field across the space separating the magnetic pole plates 5. This transverse magnetic field acts upon the established arc to move it upwardly within the slots 8 provided by a plurality of spaced ceramic plates 9. The slots 8 have their closed ends displaced laterally from the center line 10 of the plates 9, and the plates 9 are aligned with the closed ends 11 staggered about the center line 10 of the plates 9, as shown in Fig. 2.

In other words, the closed end 11 of the slot 8 of one plate 9 is displaced to one side of the center line 10, whereas the closed ends 11 of the slots 8 of the immediately adjacent ceramic plates 9 are displaced laterally on the other side of the center line 10 of the plates 9. Thus, there is provided a zigzag arc passage, generally designated by the reference numeral 12, within which the established arc is moved upwardly within the arc chute 3 by the transverse magnetic field to effect the extinction thereof.

As shown more clearly in Fig. 2, a pair of arc shields 13 may be provided to form a tapered entrance portion to the arc passage 12.

Referring again to Fig. 1, it will be observed that a pair of terminal bushings 14, 15 are provided, through which pass the terminal studs 16, 17 of the interrupter 1. A supporting plate 18 may be used to rigidly space the terminal bushings 14, 15 apart. Associated with the terminal stud 16 is a stationary contact structure, generally designated by the reference numeral 19, and providing a main contact portion 20, a stationary secondary contact 21 and a stationary arcing contact 22.

Associated with the other terminal stud 17 is a stationary main contact 23. A conducting bridging member 24 connected to and movable with a movable contact arm 25 is employed to electrically interconnect the stationary main contacts 20, 23 in the closed circuit position of the interrupter, as shown by the full lines in Fig. 1.

As shown in Fig. 1, the movable contact arm 25 is pivotally connected at 26 to a pair of brackets 27 affixed to the stationary main contact 23. Disposed adjacent the outer extremity of the movable contact arm 25 is a movable secondary contact 28 and a movable arcing contact 29. Preferably, an insulating operating rod 30, pivotally connected, as at 31, to a pair of brackets 32 carried by the contact arm 25, is employed to effect the opening and closing movements of the movable contact arm 25.

The operating rod 30 is actuated by any suitable operating mechanism, not shown, which forms no part of my invention.

During the opening operation, the operating rod 30 effects clockwise rotative motion of the movable contact arm 25 about the pivot 26 to first separate the conducting bridge 24 from the stationary main contacts 20, 23. Subsequently, there occurs a separation between the stationary and movable secondary contacts 21, 28, which is followed by a subsequent separation between the stationary and movable arcing contacts 22, 29 to draw an arc therebetween.

Because of the loop circuit including the two terminal studs 16, 17, and the contact arm 25, the arc established between the stationary and movable arcing contacts 22, 29, bows upwardly and strikes the arc horn 33. This arc horn 33 is electrically connected to one end of the magnetizing coil 7. The other end of the magnetizing coil 7 is connected by a conducting strap 34 to the stationary contact structure 19. Because of the reactance of the energizing coil 7, it is somewhat difficult to force current therethrough, and to bring the coil 7 into series circuit. To facilitate the interruption of the arc portion 35 extending between the arc horn 33 and the stationary arcing contact 22, I provide a stationary transfer interrupting device, generally designated by the reference numeral 36, and including a plurality of spaced, horizontally disposed slotted ceramic plates 37. The arc portion 35 is drawn into the slots 38 of the slotted plates 37 of the transfer interrupting device 36, and interrupted therein. The arc portion 39, which then extends between the arc horn 33 and the movable arcing contact 29, at the position 40, moves upwardly within the arc passage 12 by the transverse magnetic field extending across the air space between the magnet pole plates 5.

It will be evident that upon extinction of the arc portion 35 within the transfer interrupting device 36, the coil 7 will then be in series circuit and will become energized. The right-hand end of the arc portion 39 transfers from the movable arcing contact 29 to the right-hand arc horn 41, the lower end of which is electrically connected by a conducting strap 42 to the lower terminal stud 17 of the interrupter.

The reference numeral 43 is utilized to indicate the arc, which spans the arcing horns 33, 41 and moves upwardly within the arc passage 12 to be extinguished at the closed ends 11 of the slots 8 of the plates 9 in the arc chute 3.

Certain features of the interrupting structure thus far described are set forth and claimed in United States patent application Serial No. 720,166, filed January 4, 1947, now U. S. Patent 2,632,075, issued March 17, 1953, to Herbert L. Rawlins, Robert C. Dickinson and Russell E. Frink, and assigned to the assignee of the instant application.

From the foregoing description of the circuit interrupter 1, it will be apparent that the magnet 4 consists of the yoke 6 which carries the magnetizing winding 7 and has large area pole pieces 5 extending from each side of the yoke 6. These pole pieces 5 must span the interrupting stack 3 and cover the full length of the stack with a height equal at least to the depth of the slots 8 in the ceramic plates 9. This necessitates a very long air gap with large area field poles 5, and normally results in a useless magnetic leakage flux emerging from the edges and back of the pole pieces 5 that is approximately equal to the useful magnetic flux that passes directly between the pole faces 5. This large leakage flux causes saturation to occur in the yoke 6 and the adjacent sections of the pole pieces 5 at a relatively low useful flux density between the pole pieces 5.

If the major part of this leakage flux can be suppressed, a higher density of useful flux will be obtained before saturation of the iron in the magnetic circuit begins, or, for the same useful flux densities less iron may be used in the pole pieces 5.

I have discovered that it is possible to suppress a large part of the leakage flux emerging from the back and edges of these pole pieces 5 by placing a low resistance band 45 around the edges of each pole piece 5, as indicated in Figs. 1, 2 and 12. Any leakage flux must pass out through, and link these two bands 45. In so doing, since it is an alternating flux, it generates a voltage in the short circuited bands 45 which sets up a current having an mmf. which opposes the normal magnetomotive force available on the leakage flux path.

It may be noted that the currents in these bands 45 do not link the useful flux path but only that of the leakage flux, and hence suppress the leakage flux without affecting the useful flux path. However, since the iron is relieved of carrying most of the leakage flux, a much higher useful density is obtained before saturation occurs. Approximate calculations indicate that by means of ½ inch by 1⅛ inch copper bands around pole pieces 5 or 1⅛ inches thick by 9 inches high by 19 inches long, about 85% of the leakage flux should be eliminated, resulting in about 50% increase in the useful flux density before saturation begins to limit this flux density.

In designing the suppressor bands 45, it is desirable that the self-inductance, rather than the resistance, be the major part of the impedance of the band 45. This will insure that the induced current will be more nearly opposite in phase to the normal magnetomotive force in the leakage path and thus cancels it more effectively. The calculations on the bands 45, as assumed above, indicate that these should give induced currents less than 20° off from the desired 180° phase displacement. The currents can be brought still more nearly into phase opposition by increasing the copper area, thus reducing the resistance.

Fig. 6 more clearly shows, in perspective, each of the suppressor bands 45. I have experimentally tried the leakage suppressor bands 45 with a circuit interrupter of the type disclosed in Fig. 1 and found the results very satisfactory. They indicate that the leakage flux was reduced approximately 75% and the useful flux increased at high densities by more than 60%. It is obvious that an increase in the useful magnetic flux will more forcibly cause upward travel of the arc portion 43, thereby causing more rapid interruption and also enabling higher value currents to be interrupted. Thus, the interrupting capacity of the breaker 1, as a whole, may be increased. Some test results are as follows:

| Magnetizing Current, R. M. S. Amps. | Flux Density without rings, Gauss | Flux Density with rings, Gauss | Percent Increase |
| --- | --- | --- | --- |
| 5,000 | 890 | 1,455 | 63 |
| 600 | 495 | 570 | 15 |

| Magnetizing Current R. M. S. Amps. | Total Useful Flux—Maxwells without rings | Total Useful Flux—Maxwells with rings | Percent Increase |
| --- | --- | --- | --- |
| 1,600 | 700,000 | 1,010,000 | 44 |
| 5,000 | 865,000 | 1,390,000 | 61 |

Figure 7:
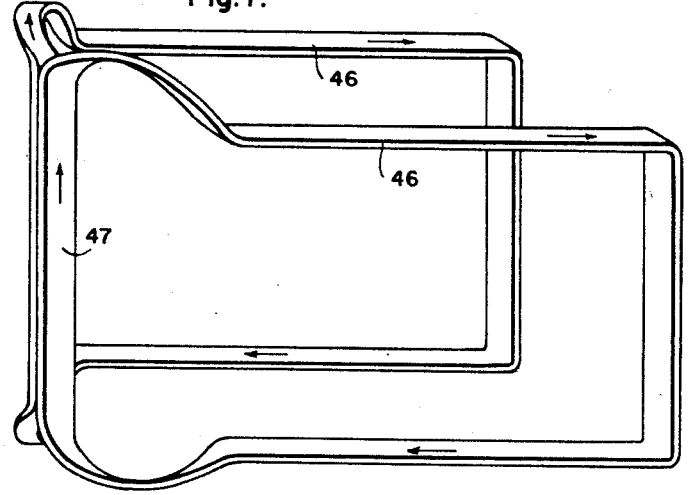
Fig. 7 is a perspective view of the type of leakage suppressor which is utilized in Figs. 3 and 4.

An alternate arrangement is shown in Figs. 3, 4 and 7 of the drawings. This alternate arrangement utilizes a pair of bands 46, which come together at the yoke end of the magnet, as at 47. This is slightly superior to the arrangement of Fig. 1, since the bands 46 link some additional leakage flux at the back of magnet yoke 6 and will tend to suppress it also.

Figure 8:
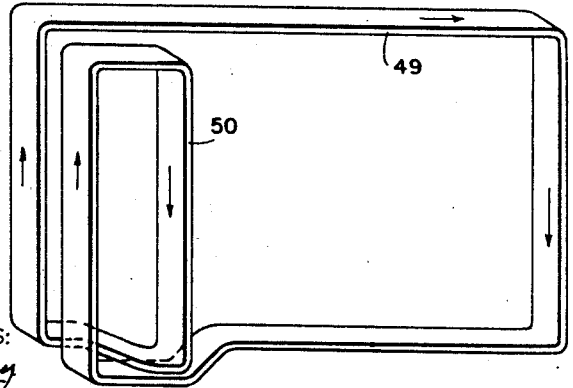
Fig. 8 is a perspective view of the type of leakage suppressor utilized in the modified type of magnet structure, pictured in Fig. 5.

Figs. 5 and 8 indicate a further modification of the invention in which a band 49 is utilized having an extra turn 50 adjacent the yoke 6. Experimental studies indicate that when bands 45, of the type shown in Figs. 1 and 6, are employed, that over most of the magnet poles 5 from the pole tip to a point approximately 16 inches from the pole tip, that is, near the yoke 6, there is actually a negative leakage, as indicated by the flux lines 70 of Fig. 12. That indicates that the suppressor mmf. actually reverses the leakage on this area and sends flux 70 into the pole 5 and through the gap as useful flux. However, opposite the yoke 6 for a distance of 3 or 4 inches, there is still a large positive leakage, as indicated by the flux lines 71 of Fig. 12, the flux densities being as high as 5,000 gauss.

It is thus apparent that over a large part of the pole face additional useful flux, which links the leakage suppressor rings but which may not link the field winding 7 at all, is brought into the field of the breaker. In this way the suppressor ring 45 not only suppresses leakage flux, but also supplies useful flux due to its own mmf. at points remote from the field winding 7, thus still further serving to equalize the useful flux over the whole area of the magnet pole, as indicated in Fig. 12.

I have discovered, from these observations, a method of improving still further, the leakage suppressor action as follows: Since practically all the leakage now occurs over a narrow band near the yoke end of the magnet, the suppressor 49 can be constructed with two or even more than two turns linking this concentrated leakage region. This will increase the induced voltage on the suppressor turn circuit. Since the added turns 50 are small, as compared to the main suppressor turn 49, the total impedance of the suppressor circuit will be increased only slightly by adding an extra turn, whereas, the induced voltage will be almost doubled. Hence, it is clear that more current will flow in the suppressor turn 49 of Fig. 8, thus producing an increase in the suppressor ampere turns. This will result in a proportionate increase in useful flux in the magnet.

In the foregoing arrangements, assuming the current through the terminal studs 16, 17 to flow, as indicated by the arrows 51 (Fig. 1), it will be apparent that the current flow in the arcs will be as indicated. The transverse magnetic field extending between the pole plates 5 will then be as indicated by the arrows 52 in Fig. 2, and leakage paths would be as indicated in 53 of Fig. 2. The current induced in the suppressor turn 45 of Fig. 1 would then be as indicated by the arrows 54 in Figs. 1 and 6.

For the same conditions, the current would flow in the same direction in the suppressor turns 46 of Fig. 7 and 49 of Fig. 5 as indicated by the arrows in these figures.

Figs. 9–11 indicate an application of my invention to a circuit interrupter utilizing an H-type of center magnet construction. Such an interrupter is more particularly set out and described in United States patent application Serial No. 720,165, filed January 4, 1947, now U. S. Patent 2,616,007, issued October 28, 1952, to Russell E. Frink and Robert C. Dickinson, and assigned to the assignee of the instant application.

Briefly, the operation of such an interrupter is such that the arc 56 established between the stationary and movable arcing contacts 22, 29 is moved upwardly by the loop circuit into engagement with the transfer arc horns 57, 58, there being three arc portions 59, 60 and 61. A transfer interrupting stack 62 interrupts the arc portion 60 and the two arc portions 59, 61 rise upwardly within the plate structure 63, 64. Each of the plate structures 63, 64 is of the type hereinbefore described in connection with Fig. 1. It will be obvious that upon extinction of the center arc portion 60 that the winding 65 will be in series circuit and will set up magnetic flux within the H-type magnet, generally designated by the reference numeral 66 and having a pair of pole plates 67 and a yoke portion 68.

To apply my invention to such a structure, suppressor bands 69, more clearly shown in Figs. 10 and 11, may encircle each pole plate 67 to minimize any magnetic leakage flux. This will intensify the amount of useful flux in the same manner as hereinbefore set out.

The foregoing shows how I have applied my invention to circuit interrupting devices, particularly those of the air-break type. By an application of my invention the amount of leakage flux is minimized and the amount of useful flux within the arc space is intensified, thereby increasing the magnetic effect upon the establised arc. This brings about more rapid arc extinction, and results in a more effective utilization of the magnetic circuit.

While leakage flux suppressor rings would be generally used with alternating current magnets, it is evident that certain benefits may also be obtained from the use of such suppressor bands on direct current magnets.

If such a band is placed on a D. C. magnet, it will suppress leakage flux during that period in which the magnetizing current and flux are increasing, that is, for a short time after the circuit is closed, or as, for example, in a series magnet, during the time when current may suddenly increase. This time is usually a critical time since a magnet frequently needs its greatest field the instant after it is energized. With a suppressor ring, the useful flux during this period actually rises higher than the steady state flux, since the suppressor ring prevents most of the leakage while flux is increasing. Of course, after the flux reaches its steady state value, the leakage suppressor has no effect on the D. C. magnet.

It is thus apparent that a blowout field on a D. C. breaker will have a higher transient flux when a short circuit suddenly appears if suppressor bands are used, than without them. The steady state flux will be the same with or without the bands. However, in opening the circuit, flux decays more rapidly in the "useful" flux path if suppressor bands are used because on decreasing flux the current in the bands reverses and hence serves to divert some of the useful flux into the leakage paths.

Fig. 13 shows the induced currents present in a continuous plate 72, which may take the place of the band 45. It is obvious that a shielding plate 72 will prevent magnetic leakage flux in the same manner that a short-circuited band 45 will. Thus, the continuous plate 72 may be considered as a plurality of abutting short-circuited bands 72a, 72b, etc., with the induced currents $I_1$, $I_2$, etc. decreasing toward the center of the plate.

Where a single band has been referred to in this patent application, it should be evident that a number of closed turns, having a total cross-section of conductor equal to the single turn, connected either in series or parallel, may be used, if desired. This, in general, however, is undesirable due to the larger space occupied because of the insulation between turns.

Although I have shown and described specific structures, it is to be clearly understood that the same were merely for the purpose of illustration, and that changes and modifications may readily be made therein by those skilled in the art, without departing from the spirit and scope of the appended claims.

I claim as my invention:

1. A circuit interrupter including means for establishing an arc, a magnet structure for extinguishing the arc including a pair of pole plates and an interconnecting yoke portion, a short-circuited band of conducting material encircling a portion of the leakage flux emanating from the back side of at least one of the pole plates and having at least one portion of the band disposed out of the region between the pole plates.

2. A circuit interrupter including a substantially U-shaped magnet structure having a pair of pole plates and an interconnecting yoke portion, means for establishing an arc, arc-extinguishing means disposed between the pole plates to effect extinction of the established arc, a short-circuited band of conducting material extending about an appreciable area of at least one of the pole plates to loop leakage flux emanating from the back side of said one pole plate, and a side of the band positioned away from the space between the pole plates.

3. A circuit interrupter including means for establishing an arc, a magnet structure for extinguishing the arc including a pair of pole plates and an interconnecting yoke portion, a short-circuited band of conducting material looping at least some of the leakage flux emanating from the back side of at least one of the pole plates and having an extra turn adjacent only the yoke portion thereof, and said band having a side portion out of the useful flux region between the pole plates.

4. A circuit interrupter including a substantially U-shaped magnet structure having a pair of pole plates and an interconnecting yoke portion, means for establishing an arc, arc-extinguishing means disposed between the pole plates to effect extinction of the established arc, a short-circuited band of conducting material disposed out of the useful flux region and encircling only leakage flux emanating from the pole plate, and said band having an extra turn adjacent only the yoke portion.

5. A circuit interrupter including means for establishing an arc, a magnet structure for extinguishing the arc including a pair of pole plates and an interconnecting magnet portion, a short-circuited band of conducting material extending substantially about the periphery of one of the pole plates and enclosing an appreciable area of the back side of said pole plate to suppress magnetic leakage flux from the pole plate.

6. A circuit interrupter including means for establishing an arc, a magnet structure for extinguishing the arc including a pair of pole plates and an interconnecting magnet portion, a short-circuited band of conducting material providing a closed current path enclosing an appreciable area of the back side of at least one of the pole plates to suppress magnetic leakage flux from said pole plate, and said conducting band having an extra turn including a region of high leakage flux concentration.

7. A circuit interrupter including means for establishing an arc, a magnet structure for extinguishing the arc including a pair of pole plates and an interconnecting yoke portion, and a short-circuited conducting structure providing one or more closed current paths enclosing an appreciable area of the back side of at least one of the pole plates to suppress magnetic leakage flux from said pole plate.

8. A circuit interrupter including a substantially U- shaped magnet structure having a pair of pole plates and an interconnecting yoke portion, means for establishing an arc, arc-extinguishing means disposed between the pole plates to effect extinction of the established arc, and a short-circuited conducting structure providing one or more closed current paths enclosing an appreciable area of the back side of at least one of the pole plates to suppress magnetic leakage flux from said pole plate.

9. A circuit interrupter including means for establishing an arc, a magnet structure for extinguishing the arc including a pair of pole plates and an interconnecting magnet portion, and a short-circuited conducting structure providing one or more closed current paths enclosing an appreciable area of the back side of at least one of the pole plates to suppress magnetic leakage flux from said pole plate.

10. A circuit interrupter including means for establishing an arc, a magnet structure for extinguishing the arc including a pair of pole plates and an interconnecting yoke portion, and a short-circuited conducting structure including a conducting continuous plate enclosing an appreciable area of at least one of the pole plates to suppress magnetic leakage flux from the pole plates.

11. A circuit interrupter including a substantially U-shaped magnet structure having a pair of pole plates and an interconnecting yoke portion, means for establishing an arc, arc-extinguishing means disposed between the pole plates to effect extinction of the established arc, and a short-circuited conducting structure including a conducting continuous plate enclosing an appreciable area of at least one of the pole plates to suppress magnetic leakage flux from the pole plates.

12. A circuit interrupter including means for establishing an arc, a magnet structure for extinguishing the arc including a pair of pole plates and an interconnecting magnet portion, and a short-circuited conducting structure including a conducting continuous plate enclosing an appreciable area of at least one of the pole plates to suppress magnetic leakage flux from the pole plates.

13. A circuit interrupter including means for establishing an arc, an H-type magnet structure for extinguishing the arc including a pair of pole plates forming the sides of the H and an interconnecting magnet portion extending between the mid portions of the pole plates and forming the cross bar of the H, a short-circuited band of conducting material extending substantially about the periphery of one of the pole plates and enclosing an appreciable area of the back side of said pole plate to suppress magnetic leakage flux from the pole plate.

14. A circuit interrupter including means for establishing an arc, an H-type magnet structure for extinguishing the arc including a pair of pole plates forming the sides of the H and an interconnecting magnet portion extending between the mid portions of the pole plates and forming the cross bar of the H, and a short-circuited conducting structure providing one or more closed current paths enclosing an appreciable area of the back side of at least one of the pole plates to suppress magnetic leakage flux from said pole plate.

References Cited in the file of this patent

UNITED STATES PATENTS

| Number | Name | Date |
|---|---|---|
| 534,731 | Thomson | Feb. 26, 1895 |
| 1,745,187 | Paul | Jan. 28, 1930 |
| 1,851,238 | Branchu | Mar. 29, 1932 |
| 2,140,378 | Biermanns et al. | Dec. 13, 1938 |
| 2,180,147 | Hopp | Nov. 14, 1939 |
| 2,463,778 | Kellogg | Mar. 8, 1949 |